(12) United States Patent
Underwood

(10) Patent No.: US 11,089,452 B2
(45) Date of Patent: Aug. 10, 2021

(54) COMMUNICATIONS NETWORK

(71) Applicant: Metaswitch Networks Ltd., Enfield (GB)

(72) Inventor: Richard Underwood, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/840,656

(22) Filed: Apr. 6, 2020

(65) Prior Publication Data
US 2020/0336867 A1    Oct. 22, 2020

(30) Foreign Application Priority Data

Apr. 18, 2019   (GB) ..................................... 1905590

(51) Int. Cl.
| H04L 12/46 | (2006.01) |
| H04M 7/00  | (2006.01) |
| H04W 4/16  | (2009.01) |
| H04M 3/56  | (2006.01) |

(52) U.S. Cl.
CPC ............... H04W 4/16 (2013.01); H04M 3/56 (2013.01)

(58) Field of Classification Search
None
See application file for complete search history.

(56) References Cited

U.S. PATENT DOCUMENTS

| 6,545,697 B1 | 4/2003 | Parker et al. |
| 7,792,019 B1 | 9/2010 | Ger |
| 2002/0093942 A1 | 7/2002 | Yegoshin |
| 2005/0003821 A1 | 1/2005 | Slyvain |
| 2005/0003857 A1 | 1/2005 | Slyvain |
| 2008/0037430 A1 | 2/2008 | Wah et al. |
| 2008/0037533 A1 | 2/2008 | Wah et al. |
| 2009/0092093 A1 | 4/2009 | Wu et al. |
| 2010/0104074 A1 | 4/2010 | Yang |
| 2010/0310059 A1 | 12/2010 | Davis et al. |
| 2011/0244835 A1 | 10/2011 | George et al. |
| 2011/0255410 A1 | 10/2011 | Yamen et al. |

(Continued)

FOREIGN PATENT DOCUMENTS

| EP | 1156654 A2 * | 11/2001 | ............ H04M 3/428 |
| EP | 1156654 A2   | 11/2011 | |

(Continued)

OTHER PUBLICATIONS

Combined Search and Examination Report dated Oct. 14, 2019 for Application No. GB1905590.4.

*Primary Examiner* — Gary Lafontant
(74) *Attorney, Agent, or Firm* — Newport IP, LLC; Han Gim

(57) ABSTRACT

A method of processing call establishment requests, the method comprising the steps of: a) receiving call establishment definition data relating to a called party identifier; b) receiving a call establishment request from a calling party, the call establishment request comprising the called party identifier; c) determining that a user terminal associated with the called party identifier is engaged in a call with a remote party; d) determining that call establishment definition data is associated with the called party identifier; and e) in response to steps b) c) and d), processing the call establishment request to connect the calling party to the called party.

5 Claims, 13 Drawing Sheets

(56) References Cited

U.S. PATENT DOCUMENTS

| | | |
|---|---|---|
| 2012/0057683 A1 | 3/2012 | Liik et al. |
| 2013/0163433 A1 | 6/2013 | Baldwin et al. |
| 2014/0105378 A1 | 4/2014 | Finlayson |
| 2014/0372555 A1 | 12/2014 | Brunsman et al. |
| 2015/0078332 A1 | 3/2015 | Sidhu et al. |
| 2015/0188727 A1* | 7/2015 | Bruner ................. H04M 7/006 370/329 |

FOREIGN PATENT DOCUMENTS

| | | |
|---|---|---|
| GB | 2488517 A | 9/2012 |
| GB | 2553725 A | 3/2018 |

* cited by examiner

US 11,089,452 B2

COMMUNICATIONS NETWORK

CROSS-REFERENCE TO RELATED APPLICATIONS

This application claims priority to GB Application No. GB1905590.4, filed Apr. 18, 2019, under 35 U.S.C. § 119(a). The above-referenced patent application is incorporated by reference in its entirety.

BACKGROUND OF THE INVENTION

Field of the Invention

The present disclosure relates to improved methods of handling call requests and establishing multi-party conference calls.

Description of the Related Technology

Traditional telephony, based on circuit-switched networks such as PSTN (Public Switched Telephony Networks) and GSM (Global System for Mobile communications), is moving towards packet-based transmission technologies such as Voice over LTE (VoLTE) and Voice over WiFi (VoWiFi). This move to packet-based technologies allows for the convergence of voice and data as well as the provision of further communication services such as instant messaging, audio and video conferencing, desktop sharing etc. One of the issues associated with these developments is that the user experience can be overly complex, especially when a user attempts to transition from one service to another.

FIG. 1 shows a schematic depiction of a conventional communications network 130, which comprises a plurality of base stations, of which only base stations 120A, 120B are shown for the sake of clarity. The communications network 130 further comprises a switching unit 140 which is configured, in use, to establish connections across the network. FIG. 1 also shows first user terminal 110A and second user terminal 110B, which are connected to each other via the communications network 130. As can be seen from FIG. 1, a call from the first user terminal is routed via the first base station 120A to the switching unit 140 and thence via the second base station 120B to the second user terminal 120B. This end-to-end connection is shown in FIG. 1 by a solid line.

Consider that a further user terminal 110C wishes to call the first user terminal 110A. The call request may be routed via the second base station to the switching unit and in response the switching unit will send a signal to the further user terminal 110C that the first user terminal is already in a call. Typically, the switching unit will send a further signal to the first user terminal to indicate that a call attempt has been made. This signal may include data uniquely associated with the further user terminal, such as a telephone number, such that the first user may take action.

For example, the first user may put the connection with the second user terminal on hold and establish a new connection to the further user terminal. Alternatively, the first user may attempt to incorporate the further user terminal into a three-way call which connects together all of the user terminals. However, this requires that specific actions are taken in the correct order and the process is not simple or user friendly.

SUMMARY

According to a first aspect of the present disclosure, there is provided a method of processing call establishment requests, the method comprising the steps of: a) receiving call establishment definition data relating to a called party identifier; b) receiving a call establishment request from a calling party, the call establishment request comprising the called party identifier; c) determining that a user terminal associated with the called party identifier is engaged in a call with a remote party; d) determining that call establishment definition data is associated with the called party identifier; and e) in response to steps b) c) and d), processing the call establishment request to connect the calling party to the called party.

In step e), the calling party may be connected to a multi-party call comprising the called party and the remote party. Furthermore, in step c) the called party identifier may be engaged in a call with more than one remote parties and in step e) the calling party is connected to a multi-party call comprising the called party and each of the remote parties. The multi-party call may be established by connecting the called party, the calling party and the one or more remote parties to a communications server.

The present disclosure allows a user to define how calls are received when the user is active in an established call. In one respect, some specified callers may be automatically connected to the user, replacing the current caller, so that, for example, important clients or family members may be connected preferentially. In a further respect, a specified caller may be merged into the existing call, for example allowing a supervisor to monitor the performance of a team member. In both of these cases, the switching or the merging of the call happens automatically in accordance with the data specified in the call establishment definition data. There is no need for the calling party or the called party to take any action to switch or merge the call.

According to a second aspect of the present disclosure, there is provided a communications network comprising: one or more nodes, the nodes being arranged to receive calls from a plurality of user terminals; a switching unit for making connections between a first network node and a second network node; and a call control unit, the network being configured, in use, to i) receive call establishment definition data relating to a called party identifier; ii) receive a from a calling party, the call establishment request comprising the called party identifier; iii) determine that a user terminal associated with the called party identifier is engaged in a call with a remote party; iv) determining that call establishment definition data is associated with the called party identifier; and v) in response to steps ii), iii) and iv), processing the call establishment request to connect the calling party to the called party. The network may connect the calling party to a multi-party call comprising the called party and the remote party. In an alternative, the calling party, the called party and the remote party may connected to a communications server to establish the multi-party call.

According to a third aspect of the present disclosure, there is provided a method of processing call establishment requests, the method comprising the steps of: a) receiving call establishment definition data, the call establishment definition data comprising a called party identity and a plurality of calling party identities, when: i) a first user terminal is associated with the called party identity; and ii) the first user terminal is engaged in a call with a second user terminal; b) sending a notification to each of one or more further user terminals, the or each further user terminal being associated with a respective calling party identity; d) receiving a call establishment request from a first further user terminal, the call establishment request comprising the calling party identifier associated with the first further user terminal and the called party identifier; e) determining that call establishment definition data is associated with the called party identifier; and f) in response to steps d) and e), processing the call establishment request to connect the first further user terminal to the called party, thereby establishing a multi-party call. The method may comprise the further steps of: h) receiving a call establishment request from a second further user terminal, the call establishment request comprising the calling party identifier associated with the second further user terminal and the called party identifier; and i) processing the call establishment request to connect the calling party to the multi-party call. The method may comprises the further steps of: j) receiving a further call establishment request from a user terminal, the further call establishment request comprising the called party identifier and a calling party identity which is not stored in the call establishment definition data; k) sending a connection request to the first user terminal associated with the called party identity; and l) connecting the user terminal which sent the further call establishment request received in step j) to the multi-party call if the connection request sent in step k) is approved by the first user terminal.

The present disclosure allows a first user who is a part of an established call to define a group of users who are required in a multi-party call, for example by selecting a list of users from within a caller app. This action causes call establishment definition data to be generated and sent to the call controller. The group of users are notified and can then call the first user terminal. The first call received by the call controller from a further user terminal may cause the established call to be ended and for the first, second and further user terminals to be entered into a multi-party call hosted by a communications server. Subsequent calls from selected user terminals to the first user terminal may then be admitted to the conference call. Calls from other user terminals, i.e. those not selected in the list, to the first user terminal may be notified to the first user terminal and the first user may decide to allow that user terminal to join the multi-party call. The present disclosure allows a conventional call to be transformed into a multi-party call in a simple manner and the other users can join the multi-party call by dialling the phone number of the first user terminal. There is no need for the first party to generate and disseminate specific multi-party call phone numbers to the other users. Also, the other users do not need to enter meeting codes or other data to access the multi-party call.

According to a fourth aspect of the present disclosure, there is provided a call connection unit configured to: receive call establishment definition data from a first user terminal, the call establishment definition data relating to a called party identifier and the called party identity being associated with the first user terminal; receive a call establishment request from a calling party, the call establishment request comprising the calling party identifier and the called party identifier; and if the first user terminal is engaged in a call with a second user terminal, connect the calling party to the first user terminal and the second user terminal in a multi-party call. The call connection unit may be further configured to establish the multi-party call by connecting the calling party, the first user terminal and the second user terminal to a communications server.

According to a further aspect of the present disclosure, there is provided a data carrier device comprising computer executable code for performing any of the methods described above.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 2:
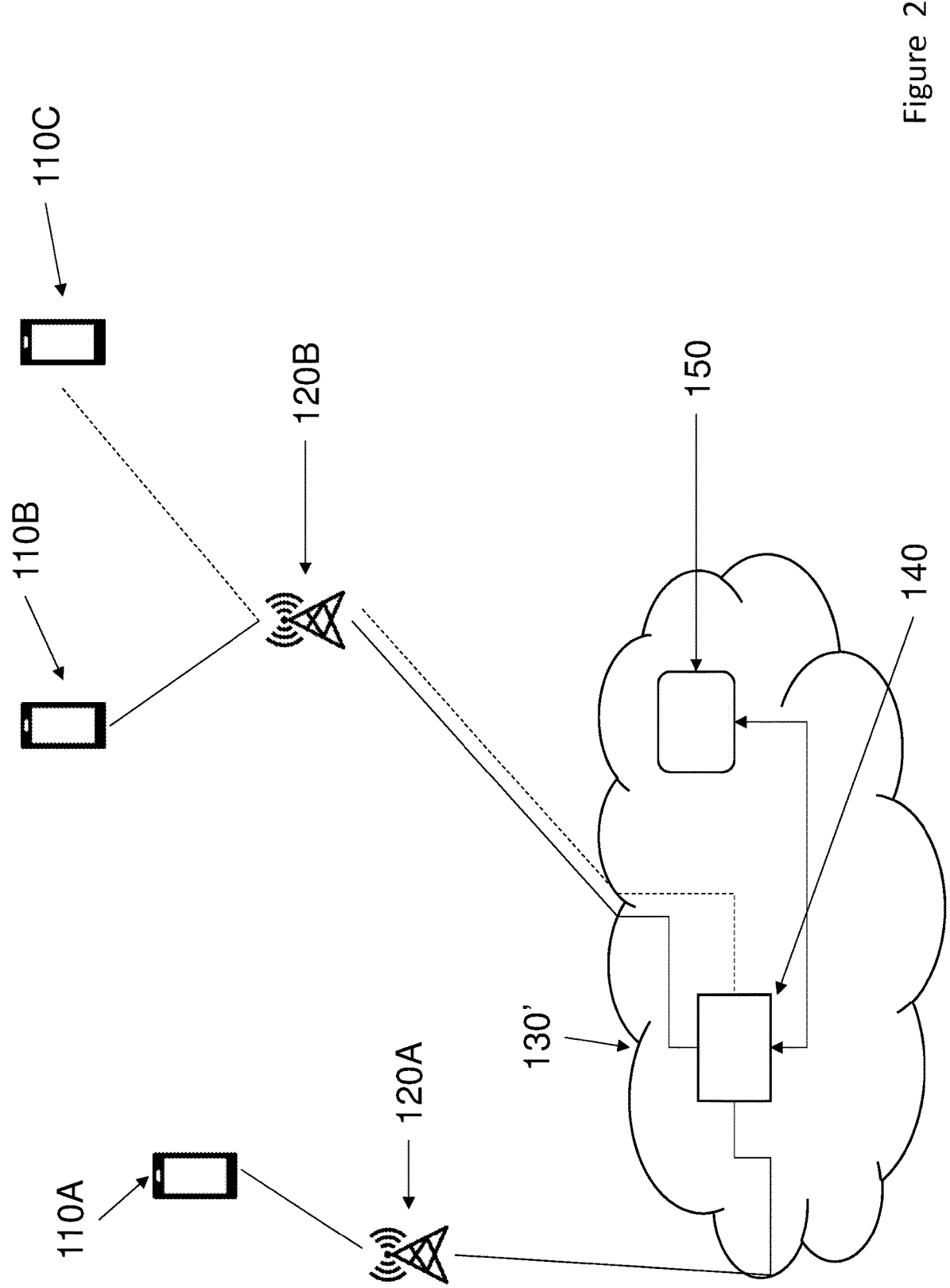
FIG. 2 shows a schematic depiction of a communications network according to a first embodiment of the present disclosure.

FIG. 2 shows a schematic depiction of a communications network 130' according to a first embodiment of the present disclosure, which comprises a plurality of base stations 120, of which only base stations 120A, 120B are shown for the sake of clarity. The communications network 130' further comprises a switching unit 140 which is configured, in use, to establish connections across the network. FIG. 2 also shows first user terminal 110A and second user terminal 110B, which are connected to each other via the communications network 130'.

The network 130' further comprises a call controller 150. A user terminal may generate call establishment definition data, which is then transmitted to the call controller 150, which may store the call establishment definition for subsequent lookup. The call establishment definition data comprises a calling party identity and a called party identity for a call (or calls). The calling party identity may comprise an identity of one or more user terminals which are associated with the calling party. Similarly, the called party identity may comprise the identity of one or more user terminals which are associated with the called party. The call establishment definition data may further comprise other data parameters as will be described in the following discussion.

Figure 1:
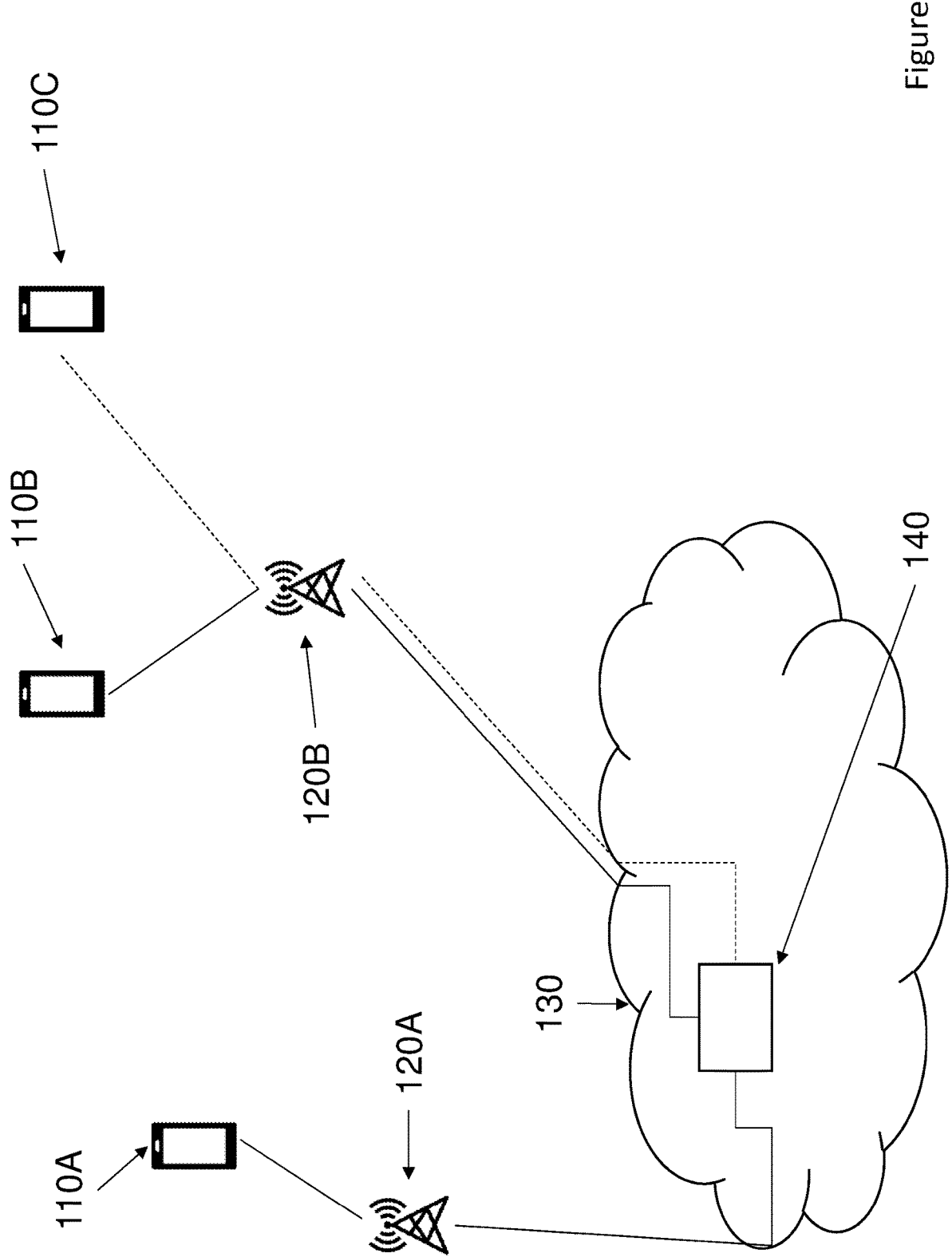
FIG. 1 shows a schematic depiction of a conventional communications network.

As was described above with reference to FIG. 1, a call from the first user terminal is routed via the first base station 120A to the switching unit 140 and thence via the second base station 120B to the second user terminal 110B. This end-to-end connection is shown in FIG. 1 by a solid line. Consider that a further user terminal 110C wishes to call the first user terminal 110A. The call request may be routed via the second base station to the switching unit. The switching unit detects that the first user terminal is already in a call and sends a query to the call controller 150. The call controller identifies that the call attempt is for the first user terminal and searches the call establishment definition data held by the call controller.

If there is call establishment definition data for which the further user terminal 110C is associated with a calling party identity and the first user terminal 110A is associated with a called party identity then the call controller may process the call in a specific manner. The call establishment definition data may contain a data parameter which defines the action which is to be taken by the call controller in respect of a particular calling party identity. The call establishment definition data may also contain a data parameter which determines a time period (or time periods) for which that action is a valid action in respect of a particular calling party identity.

One particular action that can be defined by a data parameter in call establishment definition data is a 'switch', in which the call request from the calling party (i.e. the further user terminal) is to be connected to the called party (i.e. the first user terminal) in preference to the established call between the first user terminal and the second user terminal. FIG. 2 shows the call request from the further user terminal 110C being routed to the switching unit 120 by a dashed line. The switching unit may detect that the first user terminal is already in a call and send a query to the call controller 150. If the call establishment definition data comprises a data parameter representing a 'switch' action in respect of the further user terminal then the call between the first user terminal and the second user terminal will be ended. At substantially the same time a new call will then be established between the first user terminal and the further user terminal.

Figure 3:
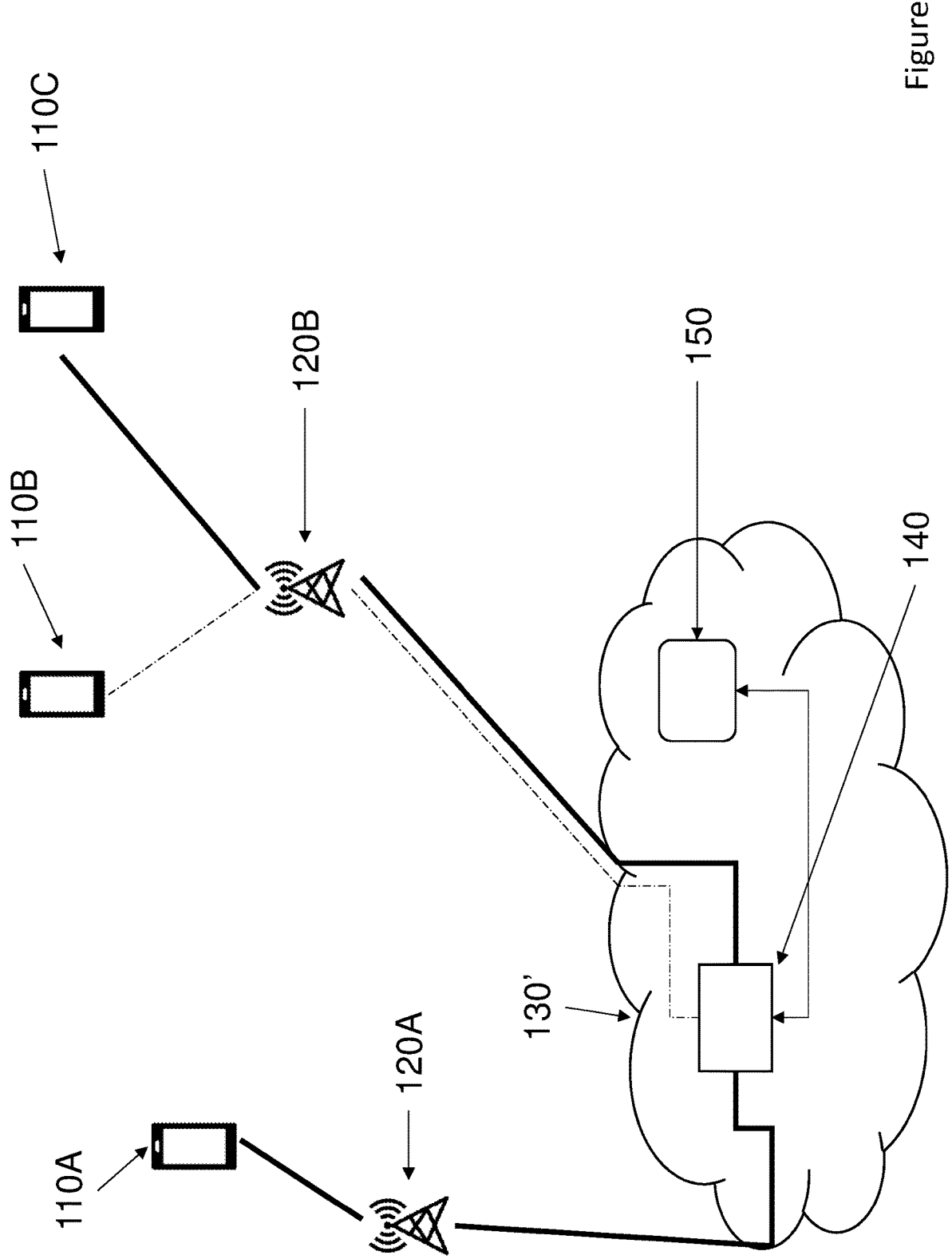
FIG. 3 shows a schematic depiction of the network of FIG. 2 when a new call has been established.

Referring to FIG. 3, which shows a schematic depiction of the network of FIG. 2 when such a new call has been established, this new call is shown by the heavy solid line. The second user terminal may be disconnected from the network or, as shown with the dot-dash line in FIG. 3, the second user terminal may be put on hold for subsequent re-connection to the first user terminal or connection to another terminal (not shown). The switching unit may cause a message to be played to the second user terminal to inform the user that the call with the first user terminal has been ended and to explain what further actions may occur.

Figure 4:
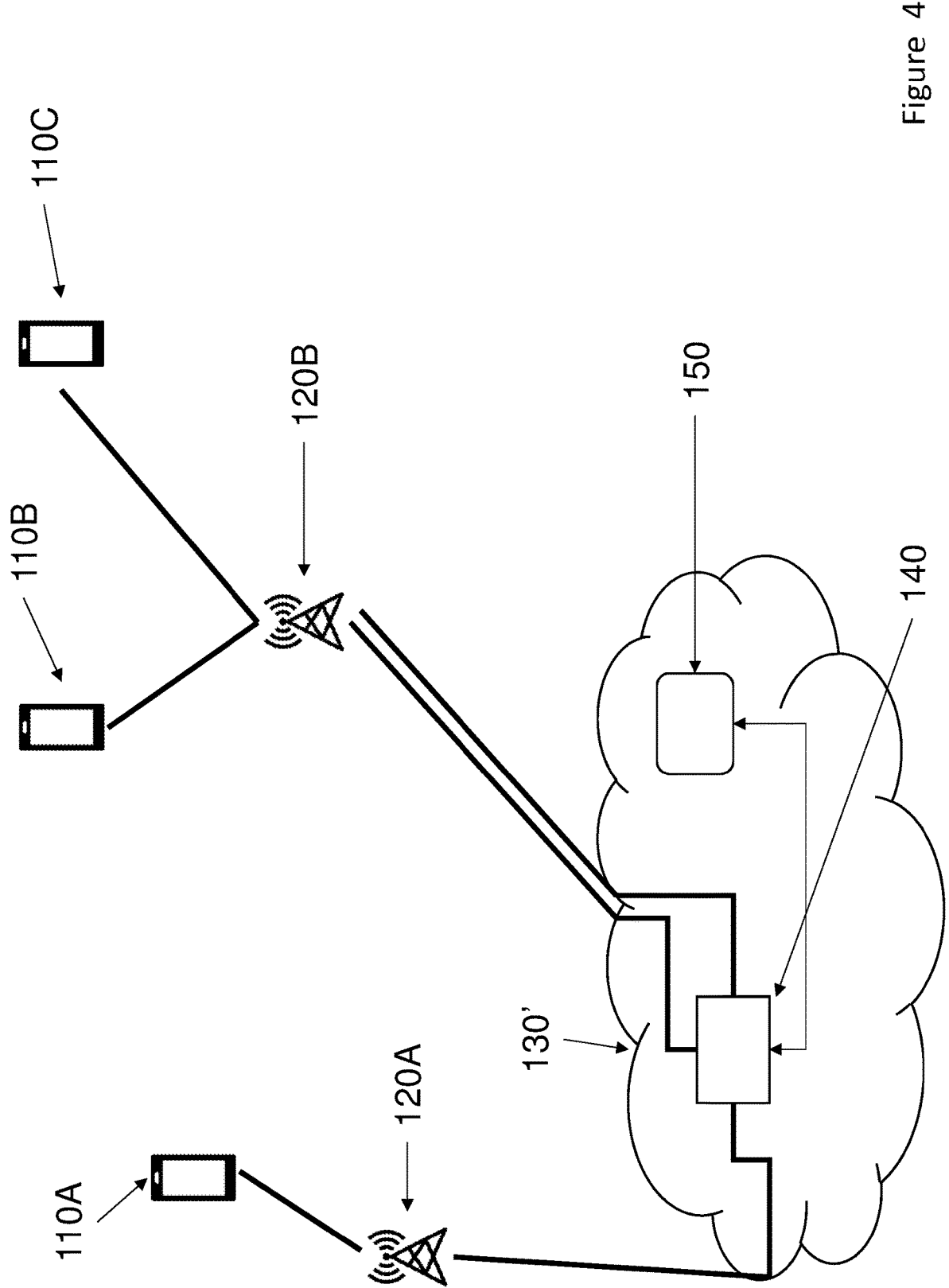
FIG. 4 shows a schematic depiction of the network of FIG. 2 when a three-way call has been set-up.

A further action that can be defined by a data parameter in call establishment definition data is a 'merge', in which the call request from the calling party (i.e. the further user terminal) is to be merged into the existing call between the called party (i.e. the first user terminal) and the second user terminal. FIG. 2 shows the call request from the further user terminal 110C being routed to the switching unit 140 by a dashed line. The switching unit may detect that the first user terminal is already in a call and send a query to the call controller 150. If the call establishment definition data comprises a data parameter representing a 'merge' action in respect of the calling party then the switching control may set up a three-way call in respect of the first user terminal, the second user terminal and the further user terminal. FIG. 4 shows a schematic depiction of the network of FIG. 2 when a three-way call has been set-up, with the routing of the three-way call being shown in heavy solid lines. If the user terminals are using circuit-based technology then the switching unit may establish the three-way call using conventional intelligent network functionality. Alternatively, if the user terminals are using SIP (Session Initiation Protocol) signalling then the three-way call may be established by sending appropriate SIP messages between the user terminals. An announcement may be made to each of the user terminals to inform the users that they are being placed into a multi-party call.

If the user terminals and/or the networks to which they are connected do not have the capability to support a multi-party call then call establishment definition data comprising a data parameter representing a 'merge' action cannot be processed and the call request may be processed in a conventional manner, for example routing the call request to a voice mail server, playing an appropriate announcement, providing an engaged tone signal, etc. Similarly, if there is no call establishment definition data for which the further user terminal 110C is associated with a calling party identity and the first user terminal 110A is associated with a called party identity then the call controller may report this to the switching unit. The switching unit may then process the call request in a conventional manner, as outline above.

Figure 5:
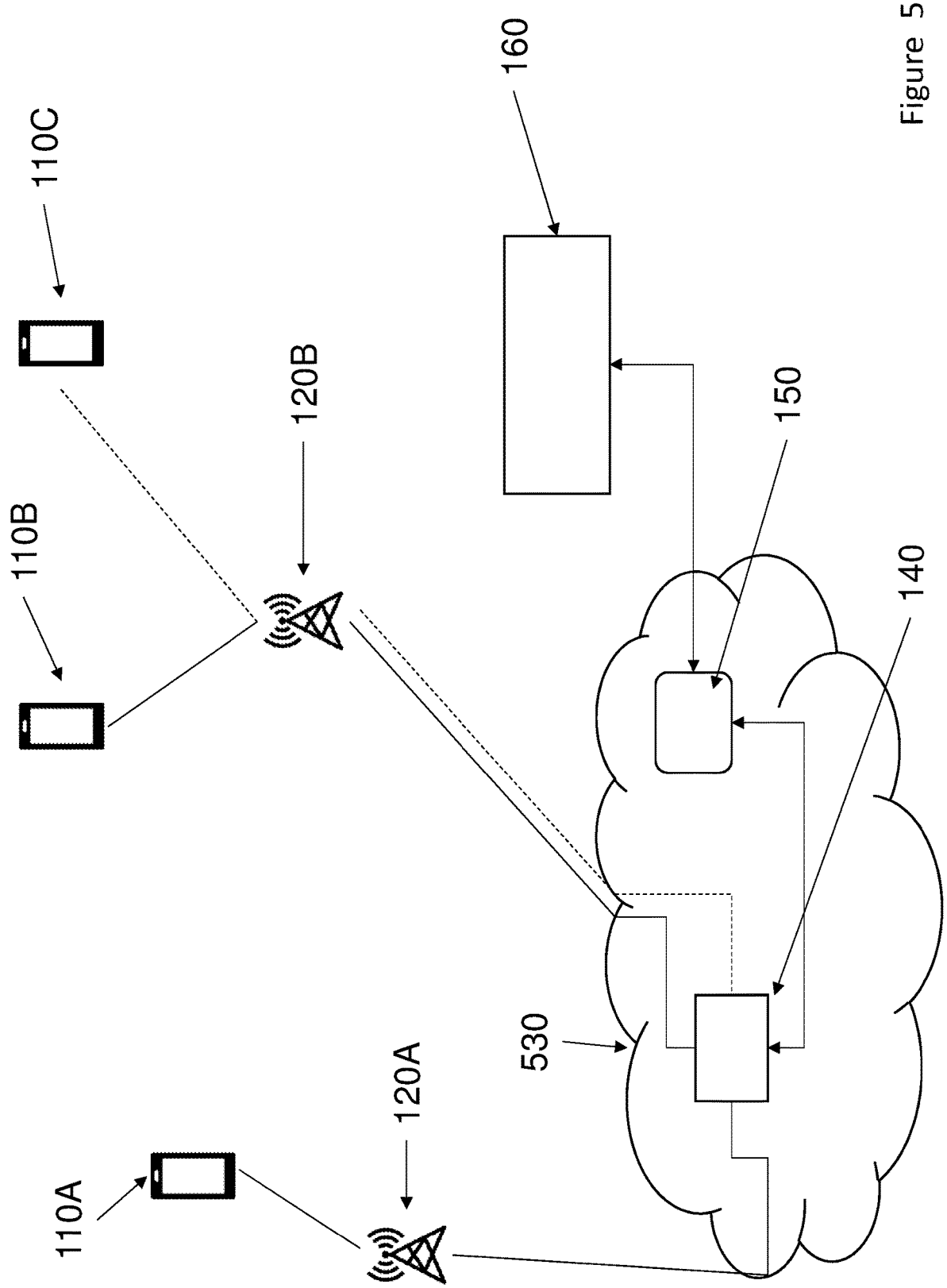
FIG. 5 shows a schematic depiction of a communications network according to a second embodiment of the present disclosure.

FIG. 5 shows a schematic depiction of a communications network 530 according to a second embodiment of the present disclosure, which can be used to implement a 'merge' action. The communications network 530 shown in FIG. 5 is the same as that discussed above with reference to FIG. 2 but with the addition of a communications server 160, which is in communication with the call controller 150. The communications server 160 has the capability to host multi-party calls, audio conferencing, video conferencing, instant messaging, document sharing, etc.

FIG. 5 shows the call request from the further user terminal 110C being routed to the switching unit 120 by a dashed line. The switching unit may detect that the first user terminal is already in a call and send a query to the call controller 150. If there is call establishment definition data for which the further user terminal 110C is associated with a calling party identity, the first user terminal 110A is associated with a called party identity and the call establishment definition data comprises one or more further parameters which represent a 'merge' action then the call request will be processed as described below.

Figure 6:
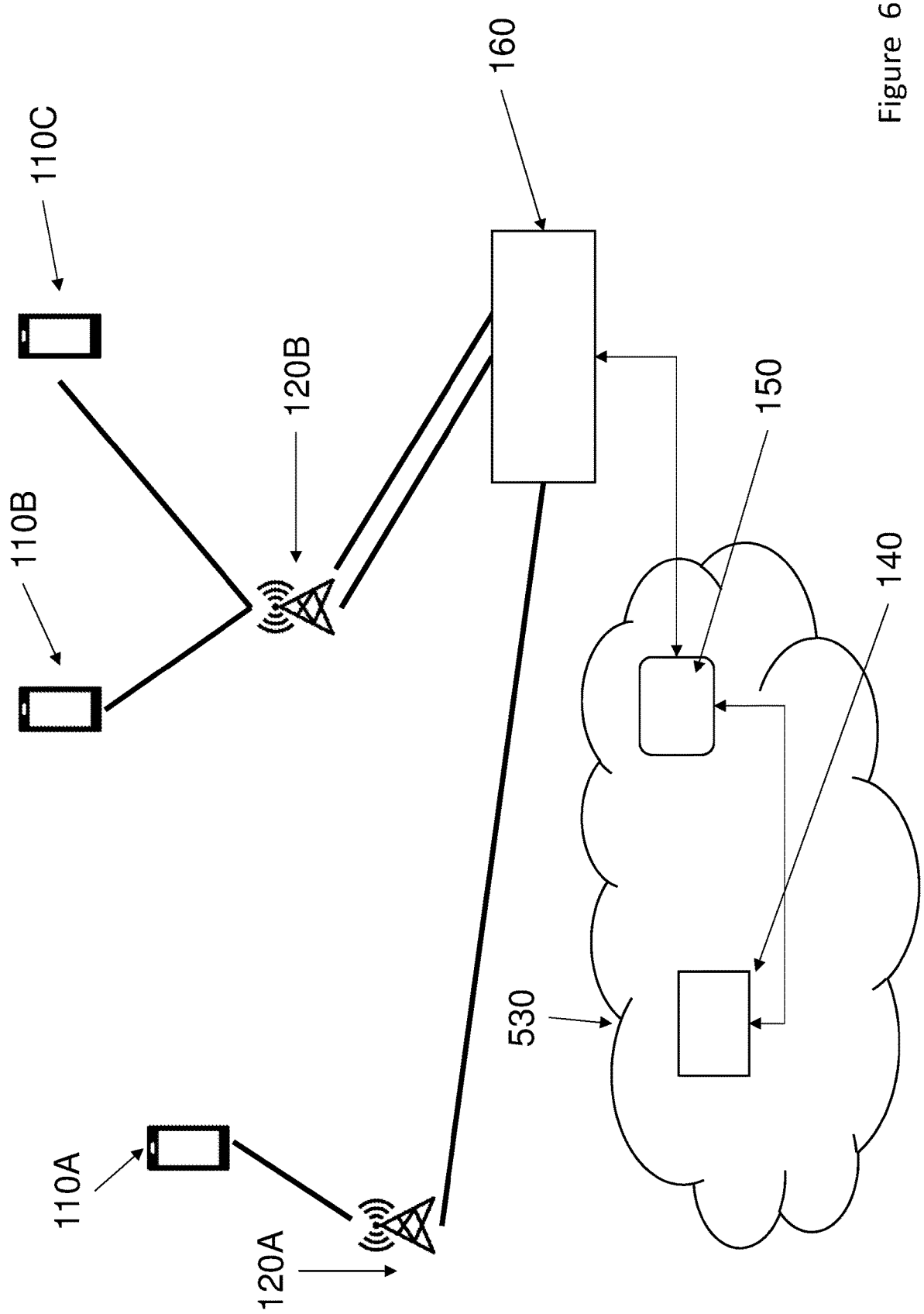
FIG. 6 shows a schematic depiction of the communications network of FIG. 5 after a multi-party call has been established.

The call controller may transmit the data in the call establishment definition data to the switching unit and to the communications server. FIG. 6 shows a schematic depiction of the communications network 530 of FIG. 5 after the call controller transmits the call establishment definition data. For each of the first user terminal, the second user terminal and the further user terminal the call connection (or attempted call connection in the case of the further user terminal) made via the switching unit 140, is terminated. At substantially the same time, each of the first user terminal, the second user terminal and the further user terminal establishes a further respective connection to the communications server. The connections to the communications server from each of the user terminals are shown by the heavy solid lines.

Once each of the first user terminal, the second user terminal and the further user terminal have established a connection with the communications server, then the three terminals are present within a multi-party call which is hosted by the communications server. Dependent on the one or more data parameters stored in the call establishment definition data and the capabilities of the communications server it may be possible for further user terminals to join the multi-party call by making a call to the first user terminal. Furthermore, it may be possible to extend the scope of the multi-party call to incorporate further services or features, such as, for example, sharing documents, instant messaging, video conferencing, etc. It will be understood that this possibility may be limited by, amongst other factors, the capabilities of the communications server, the capabilities of the user terminals, etc.

Figure 7:
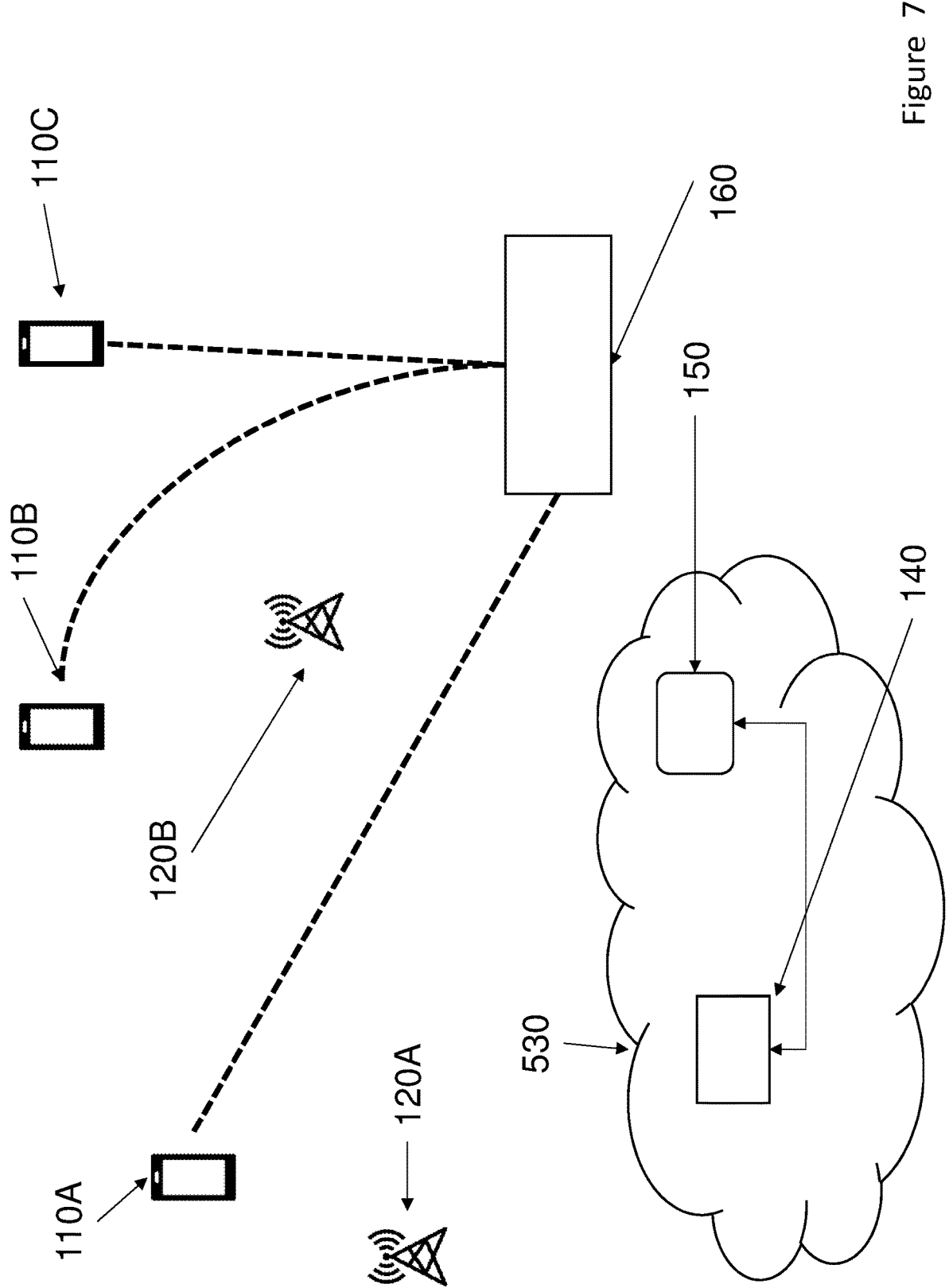
FIG. 7 shows a schematic depiction of an alternative configuration of the communications network 530 of FIG. 5 after a multi-party call has been established.

FIG. 7 shows a schematic depiction of an alternative configuration of the communications network 530 of FIG. 5 after the call controller transmits the establishment definition data to the switching unit and the communications server. For each of the first user terminal, the second user terminal and the further user terminal the call connection (or attempted call connection in the case of the further user terminal) made via the respective base station 120A, 120B, is terminated. At substantially the same time, each of the first user terminal, the second user terminal and the further user terminal establishes an over the top (OTT) Voice over IP (VoIP) call with the communications server. The OTT VoIP calls are shown in FIG. 7 by the heavy dashed lines. An announcement may be made to each of the user terminals to inform the users that they are being placed into a multi-party call.

Once each of the first user terminal, the second user terminal and the further user terminal have established a connection with the communications server, then the three terminals are present within a multi-party call which is hosted by the communications server. Dependent on the one or more data parameters stored in the call establishment definition data associated with the first user terminal and the capabilities of the communications server it may be possible for further user terminals to join the multi-party call by making a call to the first user terminal. Furthermore, it may be possible to extend the scope of the multi-party call to incorporate further services or features, such as, for example, sharing documents, instant messaging, video conferencing, etc. It will be understood that this possibility may be limited by, amongst other factors, the capabilities of the communications server, the capabilities of the user terminals and the capacity of the communications channels used to support the OTT VoIP calls.

It should be noted that for the sake of clarity FIG. 7 shows the OTT VoIP calls being routed directly between the respective user terminal and the communications server and not via a base station 120. It will be understood that one of the base stations 120 may be providing the LTE services, for example, which are used to transport the OTT VoIP call. Alternatively, the OTT VoIP call may be made using an alternative network, for example using a WiFi™ connection to a Digital Subscriber Line (DSL) connection.

Figure 8:
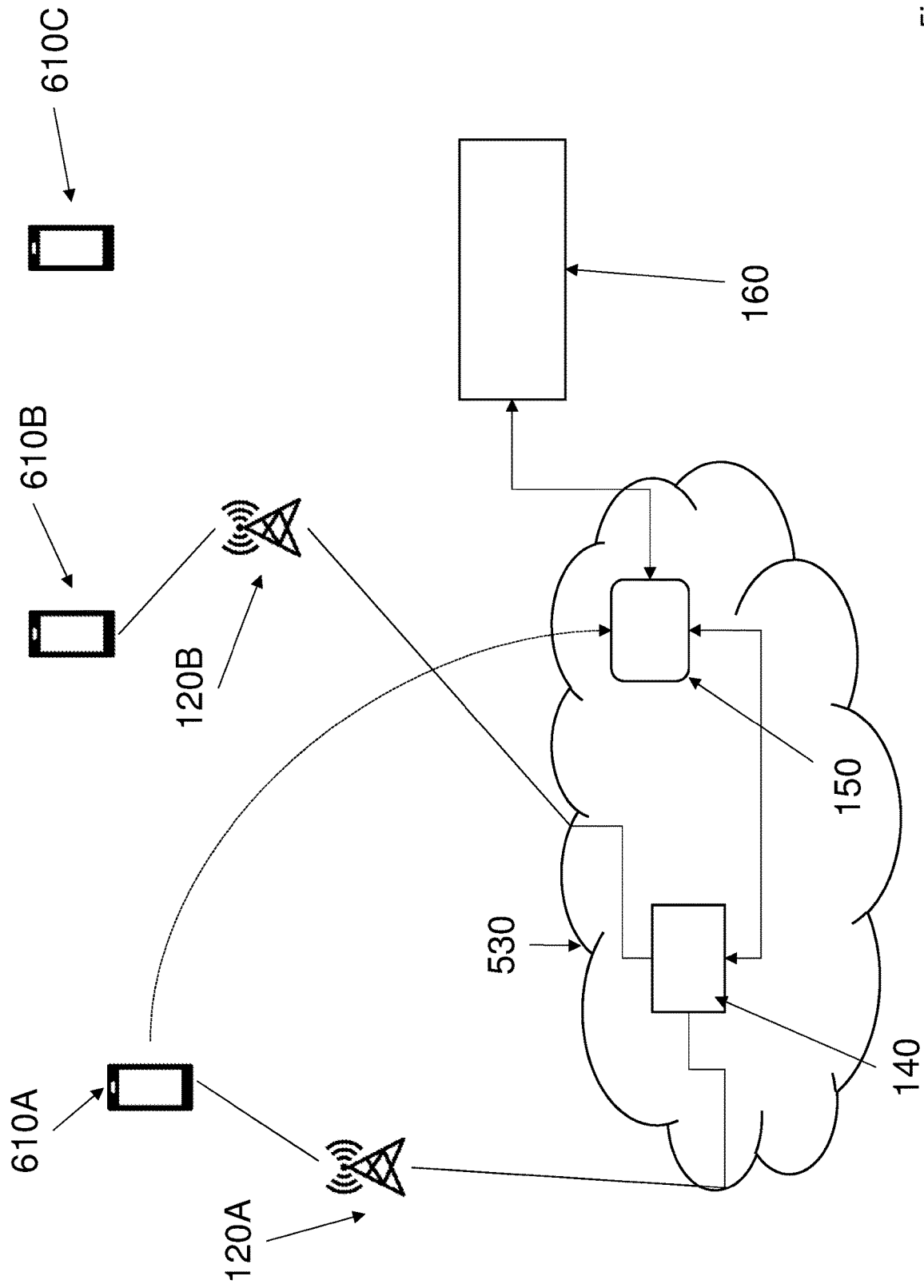
FIG. 8 shows a schematic depiction of a further configuration of the communications network of FIG. 5.

FIG. 8 shows a schematic depiction of the communications network 530 described above with reference to FIG. 5. In FIG. 8 the user terminals 610A, 610B, 610C are multi-functional apparatus which can be configured to make OTT VoIP calls and/or circuit-switched calls. Furthermore, the user terminals 610A, 610B, 610C may have their functionality extended by the provision of additional software components. Advantageously, the user terminals 610A, 610B, 610C may be smartphones, configurable softphones or other devices. First user terminal 610A makes a call to the second user terminal 610B, which is connected via the switching unit 140. The call is made and controlled by a software component which is stored on and executed by the first user terminal 610A, for example an application running on a smartphone.

During the call, there is a need to extend the call to include other parties. The application comprises a meeting button which can be selected whilst the call is taking place. By making an appropriate selection, for example by selecting one or more user identities (or a group of users), call establishment definition data can be generated by the first user terminal 610A and then transmitted to the call controller. In this case the called party of the call establishment definition data may be either the user associated with the first user terminal 610A or the user associated with the second user terminal 610B (or in an alternative, the call establishment definition data may comprise two called parties, namely both the user associated with the first user terminal 610A and the user associated with the second user terminal 610B). The call establishment definition data may comprise one or more calling parties and the calling party (or parties) are those further individuals who are to be invited into the call. Some form of notification is then transmitted to the calling party (or parties).

It will be understood that the notification mechanism is not relevant to the operation of the present disclosure. For example, the notification may be sent by the user terminal 610A after the call establishment definition data has been generated or it may be sent by the call controller once it has received the call establishment definition data, etc.

Figure 9:
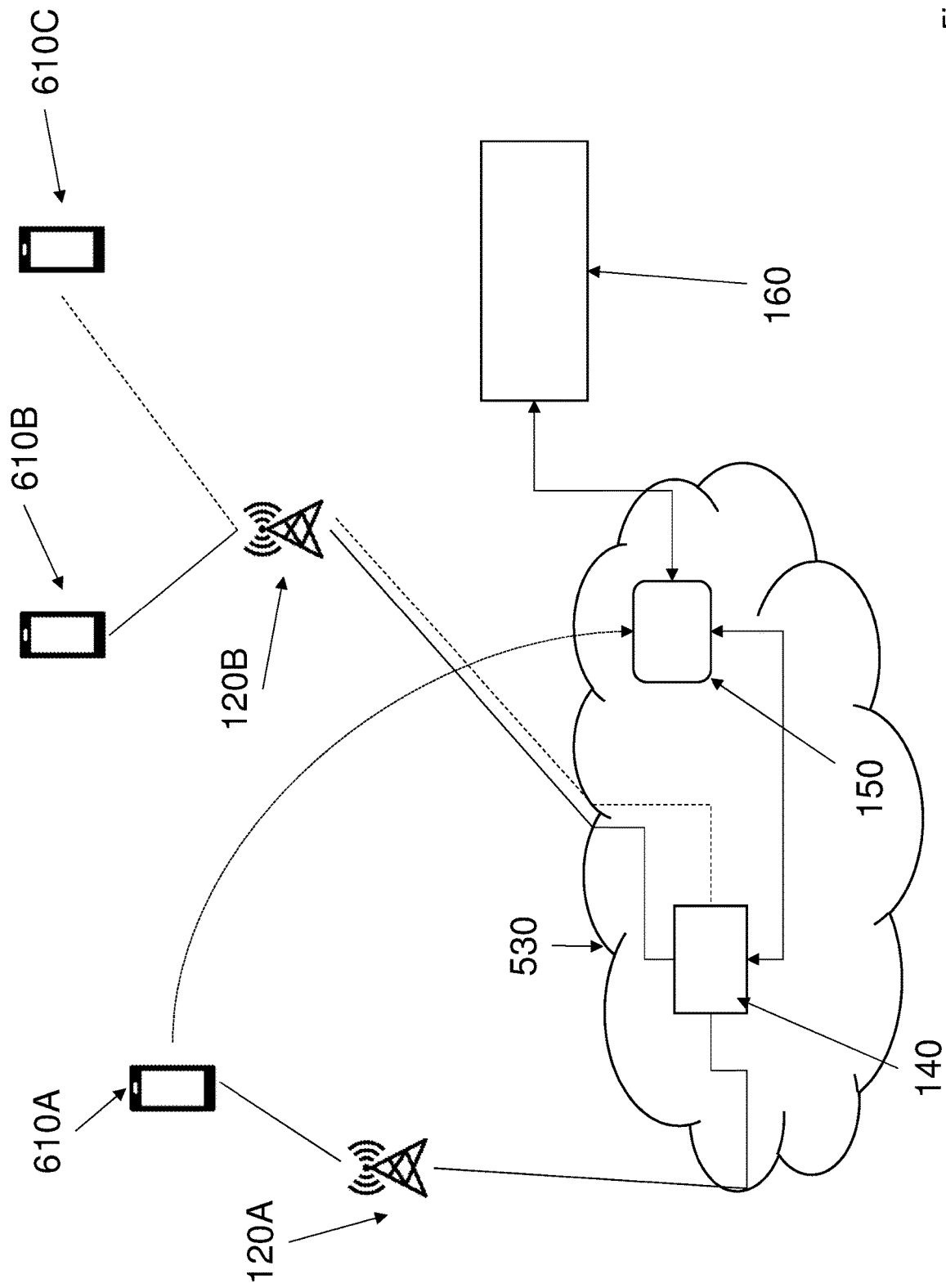
FIG. 9 shows a schematic depiction of the communications network of FIG. 8.

FIG. 9 shows a schematic depiction of the communications network 530 described above with reference to FIG. 8. Subsequent to receiving the notification regarding the generation of the call establishment definition data, the further user terminal 610C makes a call to the first user terminal 610A. The call attempt, shown by the dashed line, is routed via base station 120B to the switching unit, which detects that the first user terminal is already in a call and sends a query to the call controller 150. The call controller identifies that the call attempt is for the first user terminal and searches the call establishment definition data held at the call controller. The call controller may retrieve the call establishment definition data generated by the first user terminal 610A and in response may send a first signal to the switching unit and a second signal to the communications server. For each of the first user terminal, the second user terminal and the further user terminal the call connection (or attempted call connection in the case of the further user terminal), made via the respective base station 120A, 120B, is terminated. At substantially the same time, each of the first user terminal, the second user terminal and the further user terminal establishes an over the top (OTT) voice over IP (VoIP) call with the communications server. An announcement may be made to each of the user terminals to inform the users that they are being placed into a multi-party call.

Figure 10:
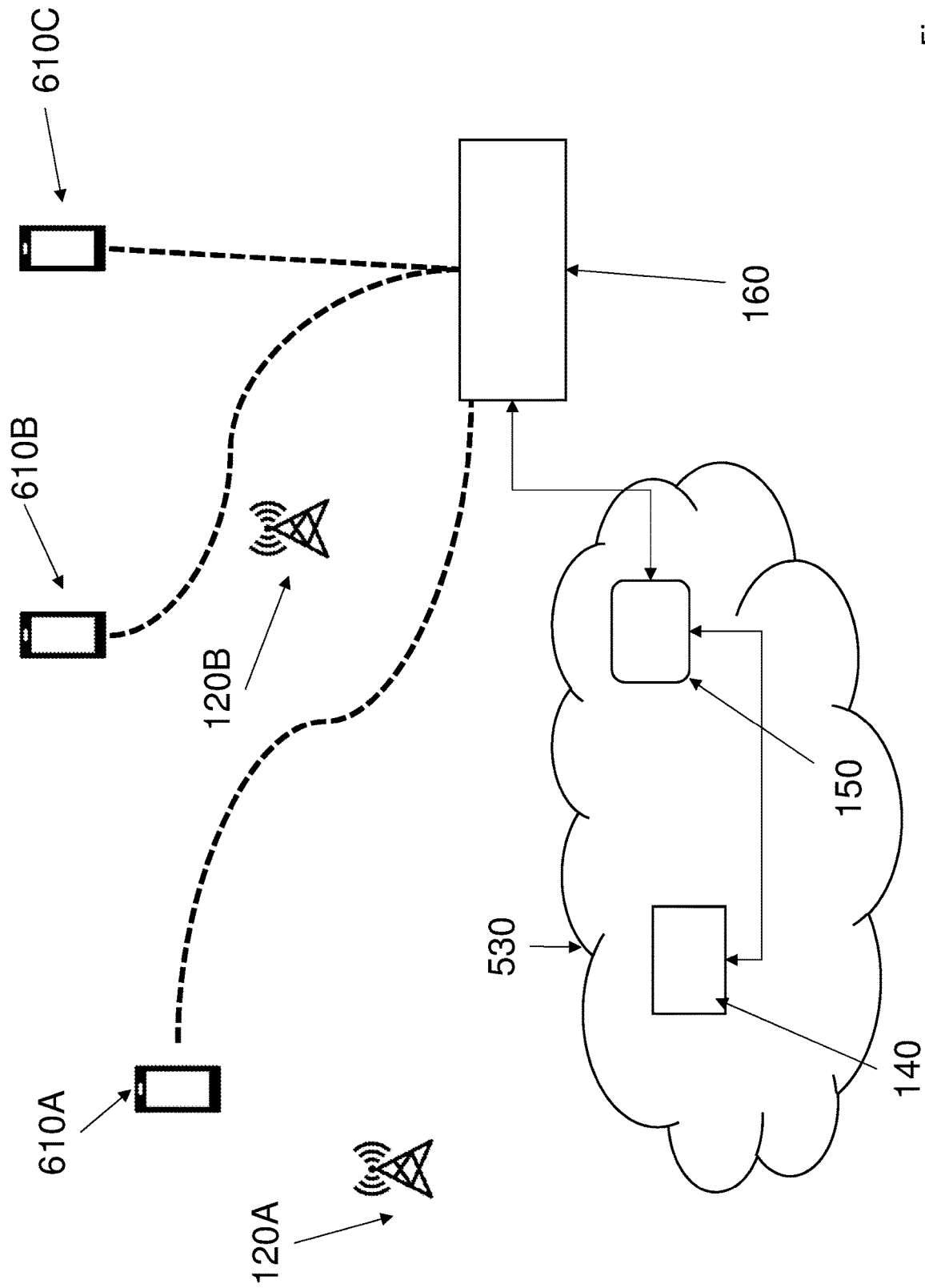
FIG. 10 shows a schematic depiction of the communications network of FIG. 9 after a multi-party call has been established.

FIG. 10 shows a schematic depiction of the communications network 530 described above with reference to FIG. 8 with the OTT VoIP calls shown in FIG. 10 by the heavy dashed lines. The result is that the existing call between the first and second user terminals becomes a multi-party call which additionally includes the further user terminal, without the need for the users to make any intervention. The further user terminal is automatically entered into the multi-party call by the action of dialling the phone number of the first user terminal. If the call establishment definition data generated by the first user terminal comprised a plurality of calling party identities then as each of calling parties calls the phone number of the first user terminal then those calling parties may also be entered into the multi-party call.

Again, as discussed above, it is possible for the multi-party call to be extended to incorporate further services or features, such as, for example, sharing documents, instant messaging, video conferencing, etc. FIG. 10 shows that the user terminals 610A, 610B, 610C are connected to the communications server 160 as OTT VoIP connections but it will be understood that the connections to the server may be made using a circuit-switched network connection, as described above with reference to FIG. 6.

Figure 11:
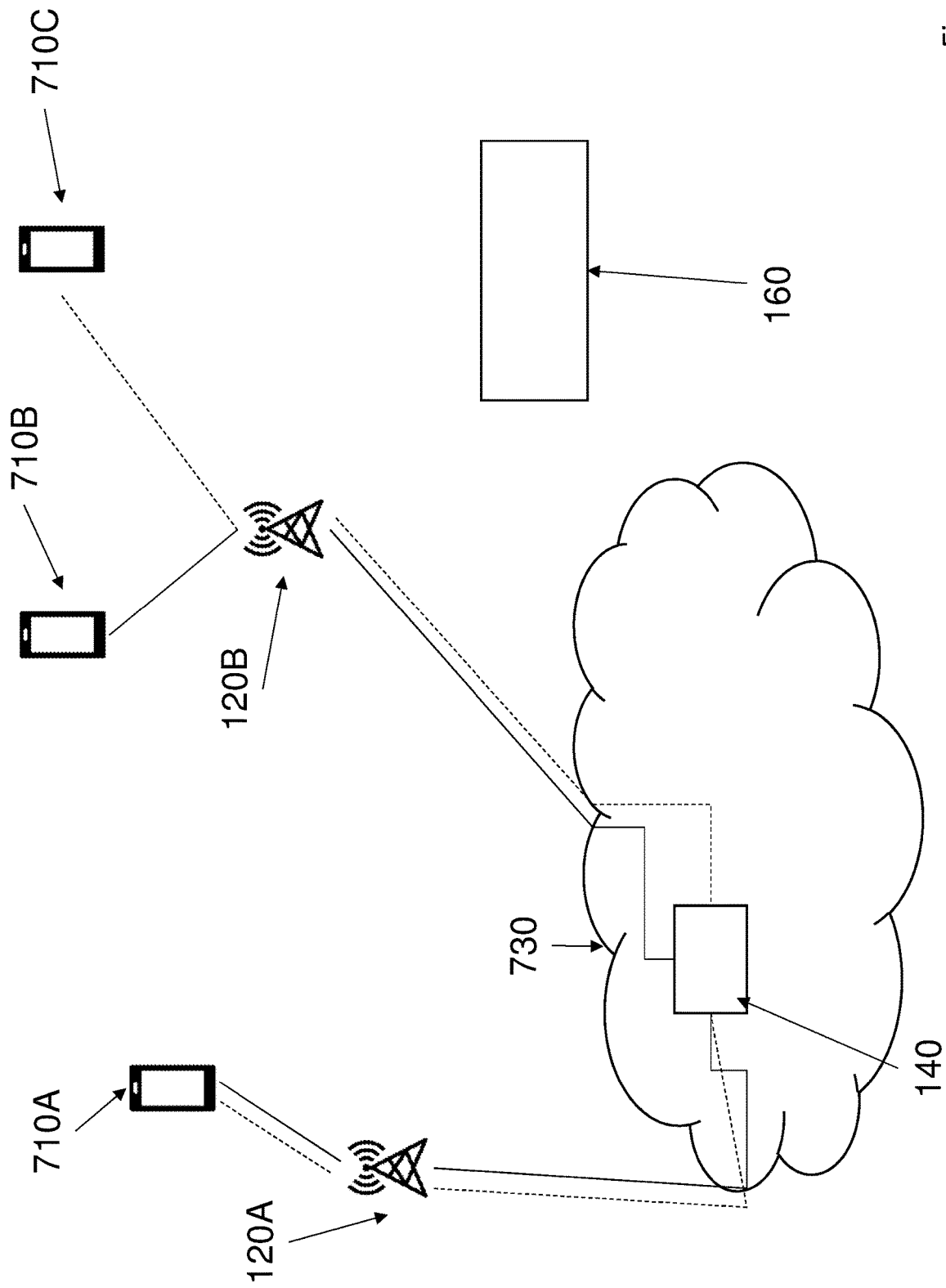
FIG. 11 shows a schematic depiction of a communications network according to a third embodiment of the present disclosure.

FIG. 11 shows a schematic depiction of a communications network 730 according to a third embodiment of the present disclosure, which comprises a plurality of base stations 120, of which only base stations 120A, 120B are shown for the sake of clarity. The communications network 730 further comprises a switching unit 140 which is configured, in use, to establish connections across the network. FIG. 11 also shows first user terminal 710A and second user terminal 710B, which are connected to each other in a call via the communications network 730, with the connection being shown by a solid line. Consider that a further user terminal 710C wishes to call the first user terminal 710A. The call request may be routed via the second base station to the switching unit. The switching unit detects that the first user terminal is already in a call and sends a query to the first user terminal. The routing of the call request from the further user terminal is shown in FIG. 11 with a dashed line.

Referring now to FIG. 11, when the user terminal 710A receives the query from the switching unit (in response to the switching unit receiving a call request from the further user terminal 710C) the software module may determine if it is storing call establishment definition data in which the first user terminal 710A is associated with a called party and the further user terminal 710C is associated with a calling party. If such call establishment definition data is present, and further comprises one or more data parameters defining a 'merge' action, then the first user terminal 710A, the second user terminal 710B and the further user terminal 710C may be connected to the communications server 160.

Figure 12:
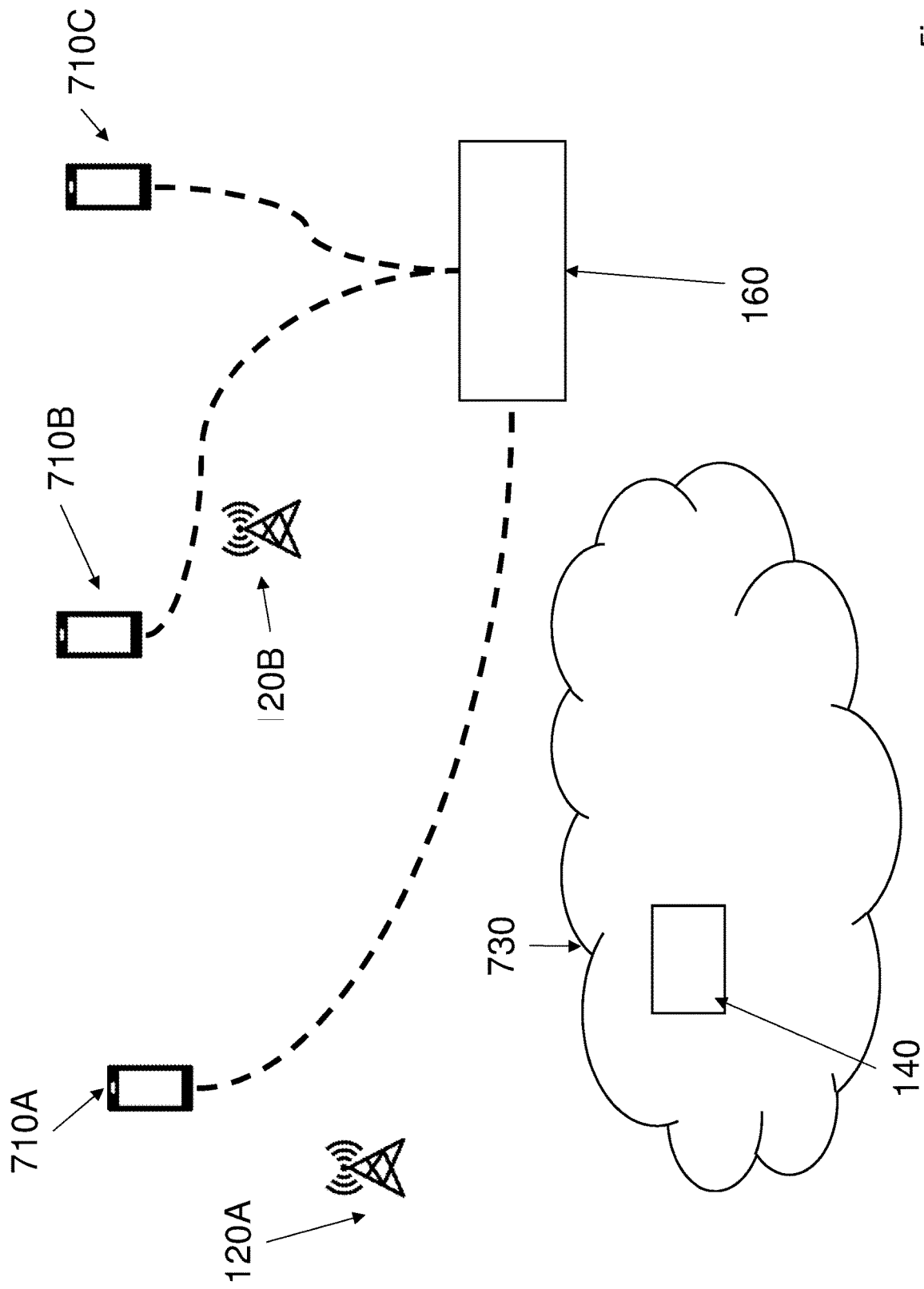
FIG. 12 shows a schematic depiction of the network of FIG. 11.

FIG. 12 shows a schematic depiction of the network of FIG. 11 when call establishment definition data indicates that the user terminals are to connect to the communications server. The software module may retrieve the call establishment definition data and in response may send a first signal to the switching unit and a second signal to the communications server. For each of the first user terminal, the second user terminal and the further user terminal the call connection (or attempted call connection in the case of the further user terminal), made via the respective base station 120A, 120B, is terminated. At substantially the same time, each of the first user terminal, the second user terminal and the further user terminal establishes an over the top (OTT) voice over IP (VoIP) call with the communications server 160.

Figure 13:
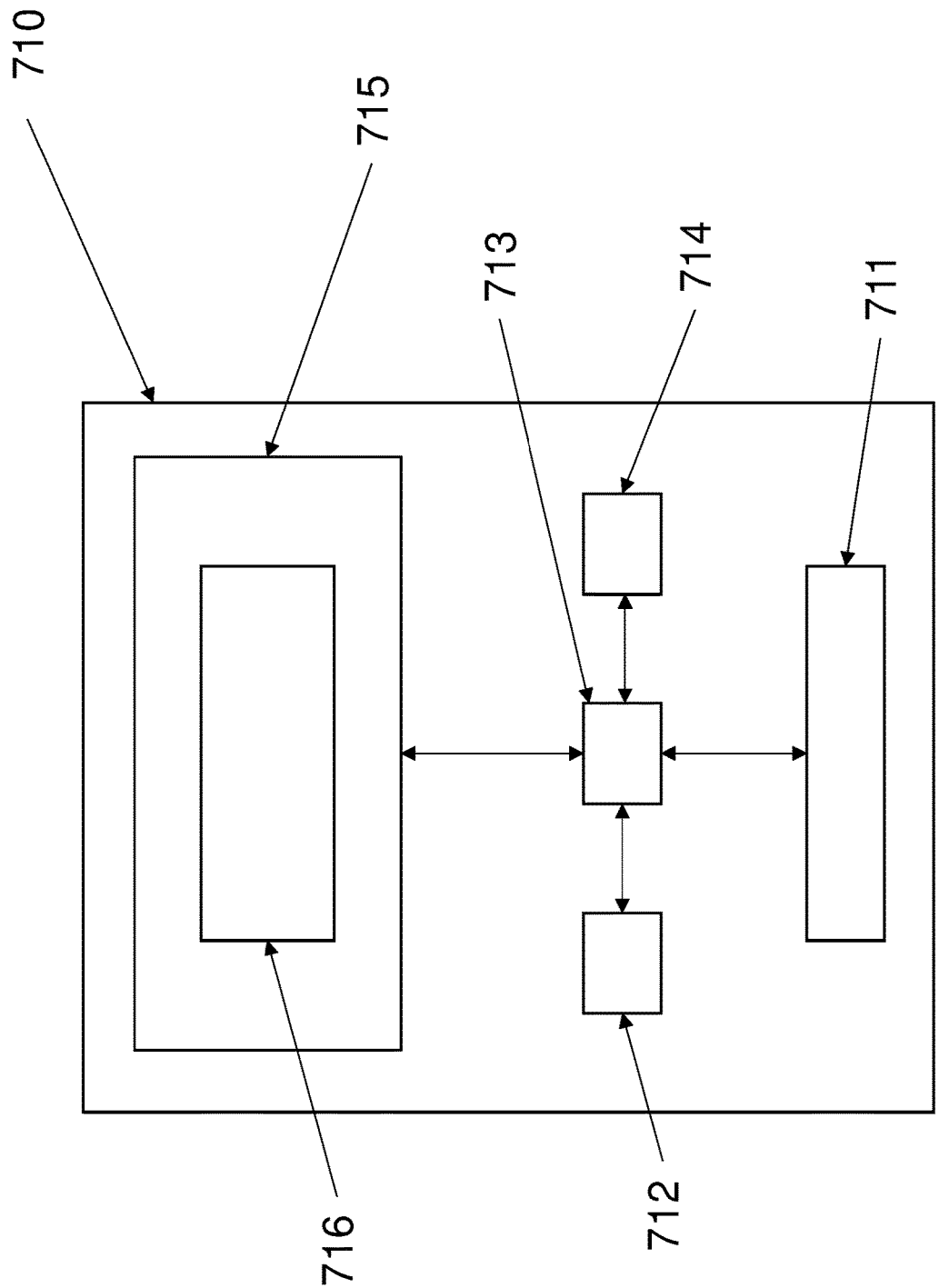
FIG. 13 shows a schematic depiction of a user terminal.

FIG. 13 shows a schematic depiction of a user terminal 710, which comprises one or more radio interfaces 711, memory device 712, central processing unit 713, data storage device 714, touchscreen 715 and a software module 716 configured to make and control calls. The user terminal may comprise a smartphone with the software module 716 comprising an appropriately configured application. The software module 716 performs the functionality of the call controller 150 described above with reference to FIGS. 1 to 10. The software module comprises a user interface which allows a user to define one or more call establishment definition data. For example, the user may select a group of users who are required to join a multi-party call (i.e. a list of calling parties) and the time that the call is scheduled for. This call establishment definition data is then stored within the software module.

It can be seen that the functionality of the call controller 150 (as described above) may be implemented within a user terminal 710A. It may be that not all of the plurality of user terminals have the capability to implement all the features of the call controller. Alternatively, it may be that a range of user terminals 110, 610, 710 of different capabilities are deployed within the same network. In such a case, or in the alternative, the network infrastructure may comprise the call controller 150. For those user terminals 710 which can implement the call controller functionality then a control signal can be transmitted to the call controller so that the call controller will not attempt to perform call control operations in respect of that user terminal.

The different aspects of the present disclosure which are described above in relation to FIGS. 1, 5, 8 and 11 are all based on a scenario in which a further user terminal attempts to make a call to a first user terminal wherein the first user terminal is already engaged in a call with a second user terminal. The attempted call from the further user terminal results in a 'switch' or a 'merge' taking place, such that the further user terminal is connected to the first user terminal or alternatively enters a multi-party call with the first user terminal and the second user terminal. It should be understood that the existing call may be a multi-party call between the first user terminal and multiple other terminals. The attempted call from the further user terminal may lead to a 'switch' taking place, such that a call is established between the further user terminal and the first user terminal. In such a case, the other parties from the existing multi-party call may be retained within that call, or alternatively the existing multi-party call may be terminated. The attempted call from the further user terminal may lead to a 'merge' taking place, such that the further user terminal is entered into the existing multi-party call.

In a further alternative, a 'partial merge' may be performed, which can be defined by a parameter held in the call establishment definition data. In such a case, the call establishment definition data comprises multiple called party identifiers which may be associated with the 'partial merge'. When the further user terminal attempts to make a call to a first user terminal when the first user terminal is engaged in a multi-party call and a 'partial merge' is performed then the further user terminal may be joined to the existing multi-party call. Furthermore, each of the terminals which were a party to the multi-party call may be maintained in the multi-party call if the terminals were associated with one of the called party identifiers held within the call establishment definition data. The terminals which are not associated with one of the called party identifiers held within the call establishment definition data may be disconnected from the multi-party call. It can be seen that the use of a 'partial merge' action allows access to a multi-party call to be controlled such that only selected users may join the multi-party call. It will be understood that further actions beyond 'switch', 'merge' and 'partial merge' may be defined within the call establishment definition data.

The preceding discussion has described the action defined by data parameters in the call establishment definition data, for example, a 'switch', a 'merge' or any other action, as being performed automatically once it has been determined that the call establishment definition data comprises an appropriate calling party identity and an appropriate called party identity. In an alternative, once it has been determined that it would be appropriate to carry out the action defined in the call establishment definition data, an audible message may be played to the further user terminal to inform the calling party that the called party is currently engaged in a call. The called party may then be provided with a prompt to enter a particular input, or sequence of inputs, which may then cause the action defined in the call establishment definition data to be carried out.

In a similar manner, once it has been determined that it would be appropriate to carry out the action defined in the call establishment definition data then some form of audible signal may be delivered to the called party, for example injecting a distinctive pulsed tone or a voice message into the call, such that the called party is able to accept or reject the potential 'switch' or 'merge' action (or other defined action) by entering a particular input, or sequence of inputs.

In the event that the action defined in the call establishment definition data is not carried out due to an intervention by either the calling party or the called party then the call attempt may be terminated, and an explanatory message may be played to the calling party. If the called party has a voice mail service then the calling party may be invited to leave a voice mail message.

It should be understood that these two alternatives to the automatic processing of the action defined in the call establishment definition data may be implemented separately or together.

The above embodiments are to be understood as illustrative examples of the disclosure. Further embodiments of the disclosure are envisaged. For example, the switching unit may be implemented using a telephony application server (TAS). It will be understood that the functionality of the call controller 150 may also be implemented within a TAS and that the functionalities of both the switching unit and the call controller may be implemented within the same TAS. It should also be understood that in a large communications network, multiple instances of the call controller may be required. Network functions virtualization (NFV) may be used to create instances of the switching unit and/or the call controller as required.

The communications server has been described as being part of the communications network. It should be understood that this is not key to the functioning of the present disclosure and that once the call establishment definition data has been accessed then it is possible for the user terminals to make a connection to any appropriate communications server.

The foregoing discussion has assumed that a user may define one or more call establishment definition data in relation to their own activities. However, it should be understood that it may be possible for one user to create call establishment definition data in respect of other users. For example, calls originating from a high value customer may be prioritised over calls originating from other customers, with call handling staff each having call establishment definition data which allows 'switch' actions to be performed when a call is received from the high value customer. Similarly, call handling staff may each have call establishment definition data which allows their manager to perform a 'merge' action, such that the performance of call handling staff can be assessed, enabling the manager to provide useful feedback. It will be understood that the ability to define call establishment definition data for others may be limited in accordance with organisational structures and requirements.

Call establishment definition data may be generated using a user terminal, for example, an app being run by a smartphone (or similar). It should be understood that other devices or apparatuses may be used to generate call establishment definition, for example an application being executed on a PC or laptop which cannot function as a user terminal, via an account accessible by a web browser, etc.

If a call has been transformed into a multi-party call in the manner described above then when further user terminals call a terminal which is connected to the call then the further user terminal(s) may be admitted into the multi-party call if the terminals are associated with respective calling parties and called parties in call establishment definition data.

If a further terminal is not associated with a calling party in call establishment definition data then normally the call request would be denied, as described above. However, the call controller may transmit a notification to one or more called parties defined in the call establishment definition data, the notification comprising the user terminal identities of the further terminal. A called party may then decide to allow the further user terminal to connect to the multi-party call despite the further user terminal not being associated with a calling party defined in the call establishment definition data.

Although the call establishment definition data may include a calling party identifier, it should be understood that call establishment definition data need not include a calling party identifier. Call establishment definition data may include a single authorised calling party identifier, or multiple authorised calling party identifiers.

Although the preceding discussion has described the call establishment definition data as comprising the 'switch' and 'merge' actions, it should be understood that call establishment definition data need not include an explicit action parameter, or indeed may define further or alternative actions. Call establishment definition data may be generated before a call is made or during an existing call. Call establishment definition data may persist until it is cancelled or modified. Alternatively, call establishment definition data may be defined for a specific period of time. Once this period has elapsed that then the call establishment definition data may be discarded.

Whilst some of the examples of the present disclosure have described all of the connections between the user terminals comprising circuit-switched network connections and other examples have shown all of the connections between the user terminals and the communications server comprising OTT VoIP connections, it should be understood that the nature of the connection between the communications server and the respective user terminals is not critical to the present disclosure. Other network connections may be used, and the limitations of one or more of the user terminals may mean that a mix of fixed networks, mobile networks and different transport technologies or applications are used to provide the respective connections between the user terminals and between the user terminals and the communications server. It should be understood that a call need not be a voice call but may comprise a video call. In the event that a multi-party call comprises a video call and the user terminal associated with a calling party does not have the capability to display video then the user terminal may be connected such that it receives the audio component of the video call. Similarly, if a party to a video call is connected to the video call by a low capacity or congested network then the user may choose to be connected to just the audio component of the video call. In an alternative, if network congestion is detected then the connection server may cause the user terminal to receive only the audio component of the video call.

As the present disclosure can be implemented on software by a conventional computing apparatus, computer code may be accessed via download, for example via the internet from an ISP, or on some physical media, for example, DVD, CD-ROM, USB memory stick, etc. for which the computing apparatus has an appropriate media reader.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing call establishment requests, the method comprising the steps of:
   a) receiving call establishment definition data relating to a called party identifier;
   b) receiving a call establishment request from a calling party, the call establishment request comprising the called party identifier;
   c) determining that a user terminal associated with the called party identifier is engaged in a call with a remote party, the user terminal being associated with a called party;
   d) determining that call establishment definition data is associated with the called party identifier; and
   e) in response to steps b) c) and d), processing the call establishment request to connect the calling party to the called party,
   wherein in step e), the remote party is disconnected from the called party.

2. The method of claim 1, wherein the call establishment definition data further comprises a plurality of calling party identifiers and/or a plurality of called party identifiers.

3. The method of claim 1, wherein the call establishment definition data further comprises one or more terminal identifiers for terminals associated with a called party and/or a calling party.

4. A communications network comprising: one or more nodes, the one or more nodes being arranged to receive calls from a plurality of user terminals; a switching unit for making connections between a first network node and a second network node; and a call control unit, the communications network being configured to perform the method of claim 1.

5. A data carrier device comprising computer executable code for performing the method of claim 1.

* * * * *